No. 827,795. PATENTED AUG. 7, 1906.
A. J. FOUCHER.
BOOM CHAIN COUPLING.
APPLICATION FILED DEC. 5, 1905.

WITNESSES:
Harry L. Amer
J. K. Gedney

INVENTOR
Andrew J. Foucher
BY
Dudley, Browne & Norton
ATTORNEYS

UNITED STATES PATENT OFFICE.

ANDREW J. FOUCHER, OF HOPE, IDAHO.

BOOM-CHAIN COUPLING.

No. 827,795.

Specification of Letters Patent.

Patented Aug. 7, 1906.

Application filed December 5, 1905. Serial No. 290,479.

*To all whom it may concern:*

Be it known that I, ANDREW J. FOUCHER, a citizen of the United States, residing at Hope, in the county of Kootenai and State of Idaho, have invented certain new and useful Improvements in Boom-Chain Couplings; and I do hereby declare the following to be a full, clear, and exact description of the invention, such as will enable others skilled in the art to which it appertains to make and use the same.

This invention relates to an improved coupling for booming-chains and the like, and has for its object the production of a device of this character the coupling members of which are readily connected and disconnected when desired, but are held in coupled relation against accidental disconnection.

The nature of the invention will be readily understood, reference being had to the following detailed description and to the accompanying drawings, in which—

Figure 1:
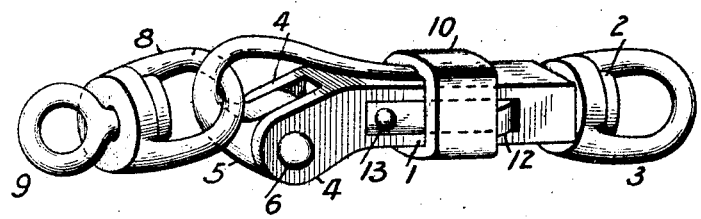
Figure 2:
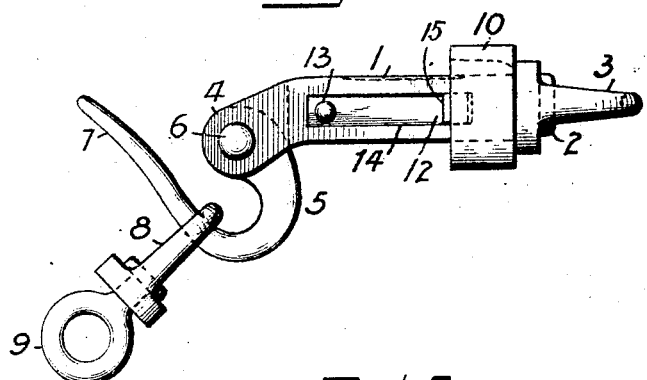
Figure 3:
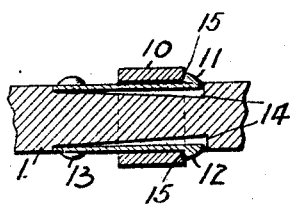

Figure 1 is a perspective view of the coupling, the parts being in connected and locked condition. Fig. 2 is a side elevation showing the parts in uncoupled condition. Fig. 3 is a horizontal sectional view.

Referring to the drawings by numerals, 1 designates the main body of the coupling of rectangular cross-section and provided at one end with a headed pin 2 for connection with a swivel-eye 3, to which an end of the chain or the like is attached. The other end of said body is at an angle to the latter and is bifurcated to provide ears 4, between which is arranged the pivoted end of a hook 5, a pin 6 passing through the ears and hook end serving as the pivot on which the hook may swing.

The free end 7 of the hook is adapted in coupling position to rest in a shallow recess in the top of the body 1, in which position it confines a link 8, having swivel connection with an eye 9 for attachment with the other end of the chain or the like.

10 is a sleeve slidable on the body to confine and release the free end 7 of the hook. Fig. 1 shows the sleeve in confining position, and in Fig. 2 the sleeve is shown in releasing position to permit the hook to swing open and free the link and eye and chain end. To lock the sleeve in confining position, I employ two spring-catches 11 12, fastened by a pin or pins 13 in recesses 14 in the sides of the body 1. Each catch has at its free end a locking-shoulder 15 normally projecting beyond the side of the body to engage the end of the sleeve when the latter is in confining position, as shown in Fig. 1. The sleeve is thus locked against accidental uncoupling movement at two points, but is readily unlocked by hand by pressing the free ends of the catches inwardly. The catch-shoulders have beveled approaches whereby the catches are forced inwardly in the coupling movement of the sleeve. As the sleeve passes the shoulders the free ends of the catches move outwardly by spring action, as will be understood.

I claim as my invention—

1. A coupling for boom-chains and the like, comprising a body, a hook pivoted thereto and adapted to bear in its closed position against said body, a sleeve slidable on the body to confine and release the free end of the hook, and a spring-catch for locking the sleeve in its confining position.

2. A coupling for boom-chains and the like, comprising a body, a hook pivoted thereto and adapted to bear in its closed position against said body, a sleeve slidable on the body to confine and release the free end of the hook, and a spring-catch at each side of said body for locking the sleeve in its confining position.

In testimony whereof I affix my signature in presence of two witnesses.

ANDREW J. FOUCHER.

Witnesses:
A. G. LIND,
C. T. LASCHINGER.